United States Patent
Hua et al.

(10) Patent No.: US 10,880,830 B2
(45) Date of Patent: Dec. 29, 2020

(54) SYSTEMS AND METHODS FOR SELECTIVE PREEMPTION OF UE POWER SAVING MODE (PSM)

(71) Applicant: Verizon Patent and Licensing Inc., Arlington, VA (US)

(72) Inventors: Suzann Hua, Walnut Creek, CA (US); Sudhakar Reddy Patil, Flower Mound, TX (US); Ye Huang, San Ramon, CA (US); Priscilla Lau, Concord, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1 day.

(21) Appl. No.: 16/288,251

(22) Filed: Feb. 28, 2019

(65) Prior Publication Data

US 2020/0280917 A1    Sep. 3, 2020

(51) Int. Cl.
*H04W 52/02*    (2009.01)
*G06F 1/3209*   (2019.01)
*H04W 76/28*    (2018.01)

(52) U.S. Cl.
CPC ...... *H04W 52/0212* (2013.01); *G06F 1/3209* (2013.01); *H04W 52/0209* (2013.01); *H04W 52/0229* (2013.01); *H04W 52/0235* (2013.01); *H04W 76/28* (2018.02)

(58) Field of Classification Search
CPC .......... H04W 52/0235; H04W 76/28; H04W 52/0212; G06F 1/3209
See application file for complete search history.

(56) References Cited

U.S. PATENT DOCUMENTS

| | | | |
|---|---|---|---|
| 2015/0296499 A1* | 10/2015 | Huang | H04W 72/048 370/329 |
| 2018/0270188 A1* | 9/2018 | Kodaypak | H04L 63/0428 |
| 2019/0174415 A1* | 6/2019 | Jia | H04W 52/0235 |
| 2019/0349858 A1* | 11/2019 | Jantzi | G06F 1/3209 |

OTHER PUBLICATIONS

Liu et al, "An Optimal PSM Duration Dalculation Algorithm For NB-IoT ", IEEE, Dec. 2019 (Year: 2019).*

* cited by examiner

*Primary Examiner* — Omer S Mian

(57) ABSTRACT

A network device associated with a wireless network receives a network service-related request from a user device. The network device accesses a service profile associated with the user device to determine if the service profile includes preemptive power saving mode (PSM) data that is designated for preempting any user device-requested or network-requested power saving modes at the user device. The network device allocates, if the service profile includes the preemptive PSM data, preemptive PSM timers to the user device based on the preemption PSM data. The network device sends, in response to the network service-related request, an acceptance message to the user device that includes the preemptive PSM timers for use by the user device in executing a power saving mode.

20 Claims, 9 Drawing Sheets

SYSTEMS AND METHODS FOR SELECTIVE PREEMPTION OF UE POWER SAVING MODE (PSM)

BACKGROUND

The "Internet of Things" (IoT) is a network of devices (i.e., "things") that are typically designed for a specific function, unlike general computing devices like desktop or laptop computers. IoT devices, or "machine-to-machine" (M2M) devices, are embedded with electronics and network connectivity components that enable these devices to collect, store and exchange data. The types of network connectivity may include, for example, Bluetooth connectivity, Wi-Fi connectivity, other short-range communication protocols, and/or cellular network connectivity. An IoT device may have computational capability, with various types of installed software (e.g., apps), and may also include one or more of various types of sensors. IoT sensors may include, for example, temperature sensors, humidity sensors, pedestrian sensors, smoke detectors, vehicle sensors, proximity sensors, motion detectors, and open/close door sensors. IoT or M2M devices may be battery-operated devices.

The Long-Term Evolution (LTE) wireless communications standards has introduced a power saving mode that is intended to improve the device battery life of, for example, IoT or M2M devices. The power saving mode enables battery powered user devices to power down during certain periods of time, and awake and communicate with a wireless network during other periods of time. The power saving mode introduced in LTE wireless communications standards enables IoT or M2M devices to have more control over power management, when executing local applications, so as to extend the life of their power supplies.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Existing wireless network standard-based power saving modes offer limited options for enabling IoT user devices, networks, and application servers to exercise individual or collective control over the power saving mode. When IoT user devices are allowed to control their power saving mode durations, due to the wide variety of IoT applications that the IoT user devices may support, the wireless network and application servers lose their ability to exercise control over the power saving mode. To optimize IoT power management, certain application servers have a need to exercise control over how long IoT user devices stay in power saving mode. Exemplary implementations described herein enable centralized entities, such as application servers, to maintain selective control and enforcement of power saving mode durations of designated user devices. For example, some IoT devices may support multiple different IoT applications, based on different timeframes or different locations, and may need different power saving mode durations. Implementations described herein permit application servers, associated with particular groups of IoT devices, to enforce the same power saving mode duration for those groups of IoT user devices preemptively over user device-requested or network-initiated power saving modes.

Figure 1:
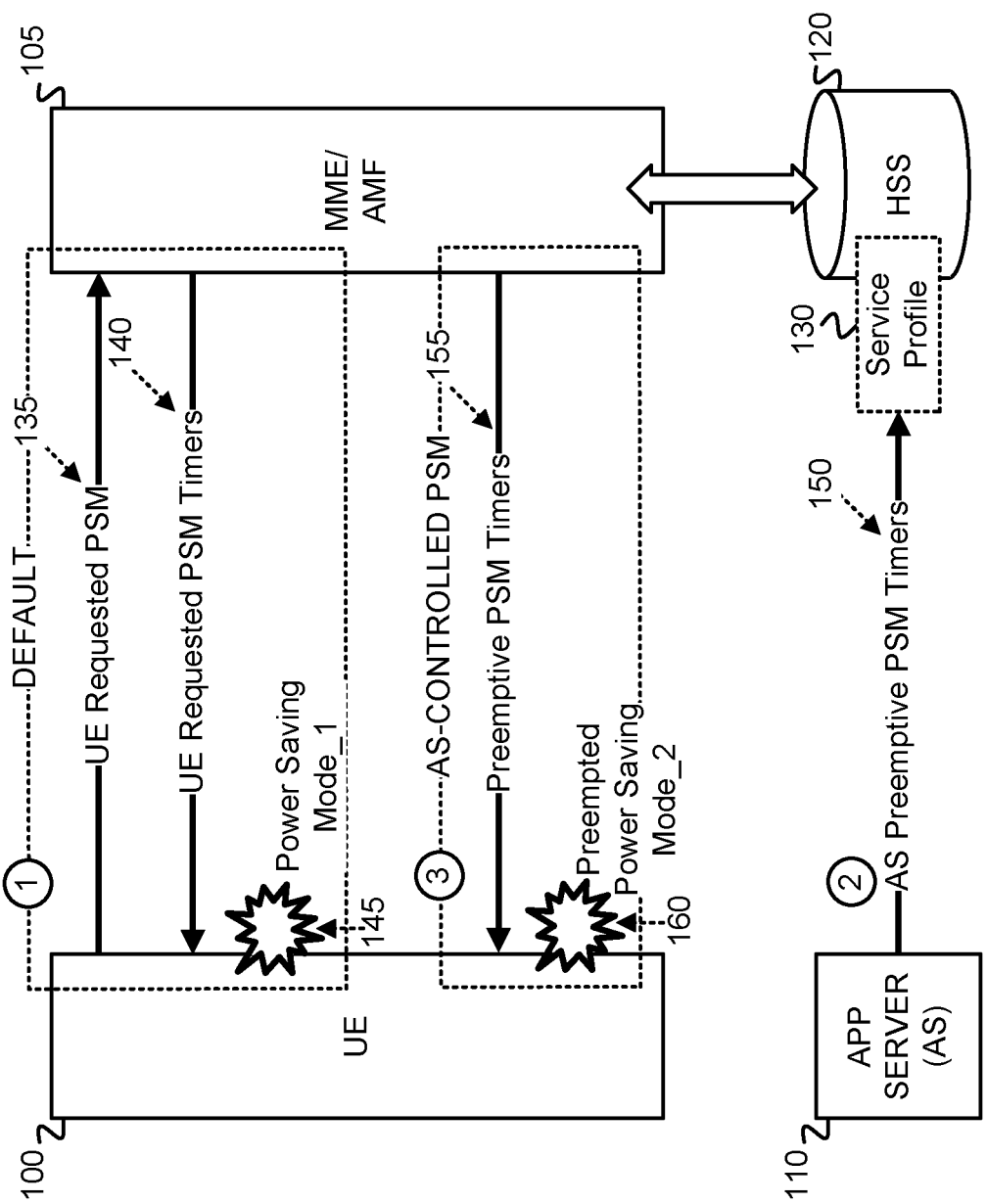
FIG. 1 illustrates an exemplary overview of selective preemptive enforcement of user device power saving mode duration by a centralized entity.

FIG. 1 illustrates an exemplary overview of selective preemptive enforcement of user device power saving mode duration by a centralized entity such as, for example, an application server (AS). As shown, a user equipment device (UE) 100 (e.g., an IoT or M2M device) may, according to a default mode, send a request 135 to a responsible wireless network node 105. The wireless network node 105 may, in one implementation, be a Mobility Management Entity (MME) of the wireless network (e.g., in a Fourth Generation (4G) network). In another implementation, the wireless network node 105 may be an Access and Mobility Function (AMF) of the wireless network (e.g., in a Fifth Generation (5G) network). In further implementations, the responsible wireless network node 105 may be a node, other than an MME or AMF, within the wireless network that implements functionality for processing power saving mode requests from UEs 100. Upon receipt of the request 135, MME/AMF 105 allocates power saving mode timers to the UE 100, based on the content of the request 135, and returns a message 140 that includes the allocated UE requested power saving mode timers. UE 100 then engages in a power saving mode (PSM) 145 using the allocated power saving mode timers received from the MME/AMF 105.

To achieve selective preemptive enforcement of power saving mode duration by UE 100 (and possibly other UEs 100 within a group of UEs 100), an AS 110 supplies AS preemptive PSM timers 150 to the wireless network's Home Subscriber Server (HSS) 120 for storage in a service profile 130 associated with the UE 100. In one implementation, the service profile 130 may be associated with a particular network subscriber that owns, operates, administers, and/or uses UE 100 and may detail specifics of parameters of the subscriber's service with a wireless network via the UE 100. The network subscriber (e.g., an administrator) may, in some implementations, supply the preemptive power saving mode timers to the AS 110 for use in controlling the power saving modes of a group of user devices. The AS power saving mode timers 150 may include one or more power saving mode-related timers that have been designated by the AS 110 for use by the UE 100 in a fashion that preempts use of any UE-requested power saving mode timers or any wireless network-controlled or network-initiated power saving mode timers.

MME/AMF 105 accesses the service profile 130 and obtains the AS preemptive PSM timers 150. MME/AMF 105 then allocates PSM timers 155 to the UE 100 based on the obtained AS preemptive PSM timers 150. In one implementation, MME/AMF 105 directly allocates the obtained AS preemptive PSM timers 150 to the UE 100 as PSM timers 155. In another implementation, MME/AMF 105 may modify the values of the obtained AS preemptive PSM timers 150 based on network conditions, or other factors, and allocate the modified AS preemptive PSM timers 155 to the UE 100. As shown in FIG. 1, MIME/AMY 105 sends a message to UE 100 that includes the allocated preemptive PSM timers 155. UE 100 then engages in a power saving mode 160 using the allocated preemptive power saving mode timers 155 received from the MME/AMF 105, instead of using any UE-requested PSM timers or network-controlled PSM timers.

Figure 2:
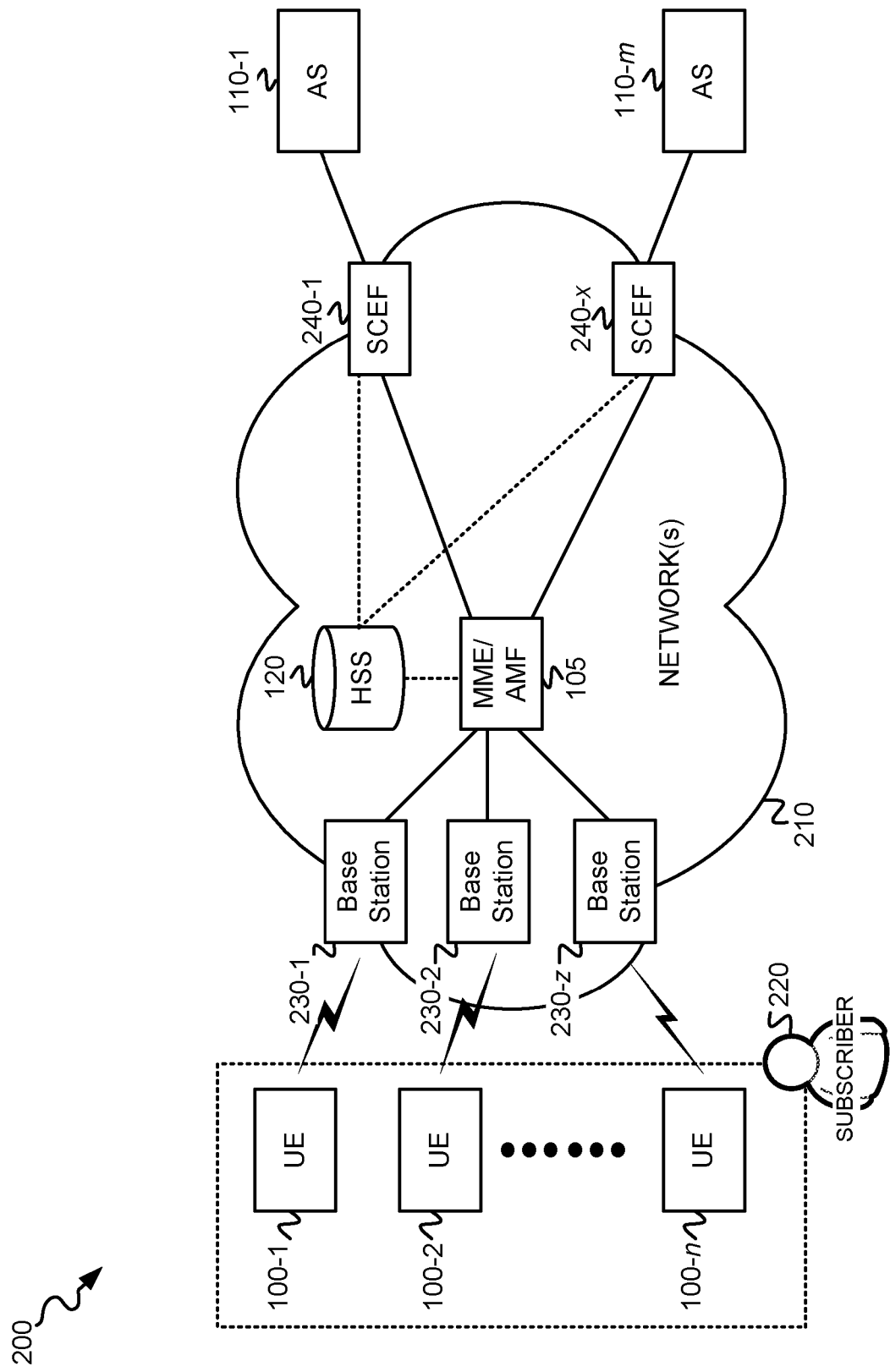
FIG. 2 depicts an exemplary network environment in which preemptive enforcement of user devices' power saving mode duration by a centralized entity may be implemented.

FIG. 2 depicts an exemplary network environment 200 in which selective preemptive enforcement of user devices' power saving mode duration by a centralized entity (e.g., an application server) may be implemented. As shown, network environment 200 may include multiple UEs 100-1 through 100-n (where n is greater than or equal to one), and multiple ASs 110-1 through 110-m (where m is greater than or equal to one, and m may not equal n) that connect to a network(s) 210.

UEs 100-1 through 100-n (referred to herein as "UE 100" or "UEs 100") may each include any type of electronic device that includes a wireless communication interface for communicating with network 210 via a wireless connection. In one implementation, at least some of UEs 100 may each include a Machine-to-Machine (M2M) device, or an "Internet of Things" (IoT) device. In other implementations, some of UEs 100 may each include a cellular telephone; a "smart" phone; a personal digital assistant (PDA); a wearable computer; a desktop, laptop, palmtop or tablet computer; or a media player. A subscriber 220 may be associated with UEs 100, where subscriber 220 may be an owner, operator, administrator, and/or a permanent or temporary user of UEs 100.

ASs 110-1 through 110-m (referred to herein as "AS 110" or "ASs 110") may each include one or more network devices that, among other functions, install, operate, and/or host applications and associated services for the UEs 100 of end users (e.g., for subscriber 220). ASs 110 additionally may obtain power saving mode timers for the UEs 100, associated with subscriber 220, that enable the ASs 110 to enact control over the durations and the timing of power saving modes executed at each of UEs 100. The power saving mode timers may be manually supplied to the ASs 110 by a respective administrator or operator of the ASs 110. Alternatively, each AS 110 may execute a power management process that determines when respective UEs 100 should transmit/receive data (e.g., at what intervals and/or for how long depending on the application(s) executing at the UEs 100), and determines power saving mode timers accordingly. Each AS 110 may execute the power management process for determining power saving mode timers for each UE 100 of a group of UEs 100 for which it is responsible, or for which it controls.

Network(s) 210 includes one or more wireless networks, and possibly one or more other types of networks of various types. The one or more wireless networks may each include, for example, a wireless Public Land Mobile Network (PLMN) or a wireless satellite network that is operated and/or administered by a particular wireless network service provider (a "carrier"). The PLMN may include a Code Division Multiple Access (CDMA) 2000 PLMN, a GSM PLMN, a Long-Term Evolution (LTE) PLMN and/or other types of PLMNs not specifically described herein. The one or more other types of networks of various types may include, for example, a telecommunications network (e.g., Public Switched Telephone Networks (PSTNs)), a wired and/or wireless local area network (LAN), a wired and/or wireless wide area network (WAN), a metropolitan area network (MAN), an intranet, the Internet, an Internet Protocol (IP) Multimedia Subsystem (IMS) network, and/or a cable network (e.g., an optical cable network).

FIG. 2 further depicts exemplary components of a wireless network of network(s) 210. As shown, the wireless network may include base stations 230-1 through 230-z, an MME/AMF 105, an HSS 120, and Service Capability Exposure Function (SCEF) nodes 240-1 through 240-x (where x is greater than or equal to one). Though not shown, wireless network 210 may additionally include one or more serving gateways (SGWs) and packet data network gateways (PGWs).

Base stations 230-1 through 230-z (referred to herein as "base station 230" or "base stations 230") each include hardware that wirelessly communicates directly with wireless devices (e.g., UEs 100) to enable network service with the wireless network. Each of base stations 230 includes a wireless transceiver for communicating with the wireless devices, and a wired or wireless link for connecting to other nodes of the wireless network such as, for example, wired links to a SGW or MME/AMF 105. In some implementations (e.g., 4G), base stations 230 may include evolved NodeBs (eNBs). In other implementations (e.g., 5G), base stations 230 may include Next Generation NodeBs (gNBs).

MME/AMF 105 includes one or more network devices that perform, within the wireless network of network(s) 210, one or more of mobility management, registration management, connection management, call control management, session management, and/or identity management associated with providing wireless service to UEs 100. MME/AMF 105 may additionally serve as a node for allocating power saving mode timers to UEs 100 based on UE-requests, network-initiated power management, and/or AS-designated preemptive PSM timers. In implementations in which the wireless network of network(s) 210 includes a 4G network, MME/AMF 105 may include a MIME. In implementations in which the wireless network of network(s) 210 includes a 5G network, MIME/AMF 105 may include an AMF. Though not shown in FIG. 2, other network nodes in network(s) 210 may perform the functions described herein as being performed by MME/AMF 105.

HSS 120 includes one or more network devices that further include a memory device(s) that stores a data structure, such as the data structure described below with respect to FIG. 4. The data structure of HSS 120 may store service profiles associated with particular subscribers and UEs 100. HSS 120 may perform, based on the information stored in the service profiles, a user authentication function, a session establishment function, and/or an access authorization function. Though not shown in FIG. 2, network nodes in network(s) 210 other than the HSS 120 may store, and enable retrieval of data from, the data structure of FIG. 4 that stores service profiles.

SGWs (not shown) of the wireless network include one or more network devices that route and forward data received from UEs 100 and destined for destination nodes in network 210; and also route and forward data received from PGWs (not shown) destined for one or more UEs 100. The PGWs (not shown) each includes one or more network devices that provide connectivity from the UEs 100 to other networks connected to the wireless network of network(s) 210, such as other external networks.

SCEF nodes 240-1 through 240-x (referred to herein as "SCEF node 240" or "SCEF nodes 240") may forward data, received (e.g., via Non-Internet Protocol (IP) data delivery) from MME 105, to a respective destination AS 110 (i.e., SCEF 240-1 forwards data to AS 110-1, SCEF 210-x forwards data to AS 110-m). SCEF nodes 240 may additionally forward data, received (e.g., via non-IP data delivery) from ASs 110, to respective destination UEs 100 (e.g., to IoT devices).

The configuration of the components of network environment 200 depicted in FIG. 2 is for illustrative purposes only, and other configurations may be implemented. Therefore, network environment 200 may include additional, fewer and/or different components, that may be configured differently, than depicted in FIG. 2. For example, though a single subscriber 220 is shown as being associated with a group of UEs 100, multiple subscribers 220 may exist in network environment 200, with each subscriber 220 being associated with one or more particular groups of UEs 100, with each group of UEs 100 including at least one UE 100.

Figure 3:
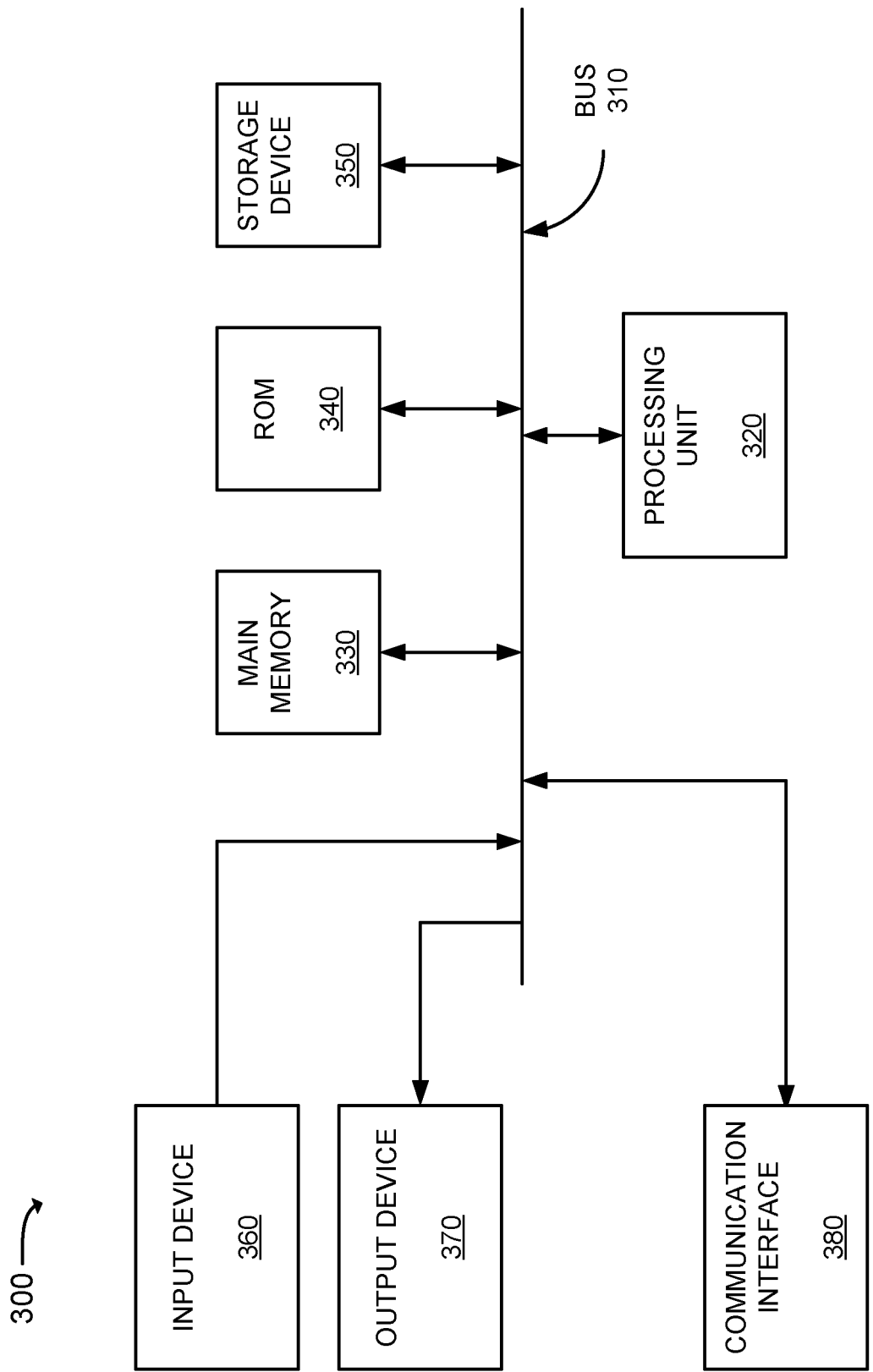
FIG. 3 is a diagram that depicts exemplary components of a device that may correspond to the user equipment, mobility management entity/access and mobility function, home subscriber server, and application servers of FIG. 2.

FIG. 3 is a diagram that depicts exemplary components of a device 300. UEs 100, base stations 230, MIME/AMY 105, HSS 120, SCEF nodes 240, and app servers 110 may each include a device or devices similar to device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors which interpret and execute instructions. Processing unit 320 may additionally, or alternatively, include logic circuitry (e.g., a field-programmable gate array (FPGA)) that executes one or more processes/functions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic and/or optical recording medium. Main memory 330, ROM 340 and storage device 350 may each be referred to herein as a "non-transitory computer-readable medium" or a "non-transitory storage medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 360 and output device 370 may be implemented as a graphical user interface (GUI) (e.g., a touch screen GUI that uses any type of touch screen device) that displays GUI information and which receives user input via the GUI. Communication interface(s) 380 may include a transceiver that enables device 300 to communicate with other devices and/or systems. For example, communication interface(s) 380 may include wired and/or wireless transceivers for communicating via network(s) 210. In the case of device 300 being an IoT UE 100, communication interface(s) 380 may include only a wireless transceiver(s), such as, for example, a wireless transceiver for communicating with a base station 230 of a wireless network of network(s) 210.

The configuration of components of network device 300 shown in FIG. 3 is for illustrative purposes. Other configurations may be implemented. Therefore, network device 300 may include additional, fewer and/or different components, arranged in a different configuration, than depicted in FIG. 3. For example, an IoT UE 100 may include similar components to those shown in FIG. 3, but may omit input device(s) 360, output device(s) 370, and storage device 350.

Figure 4:
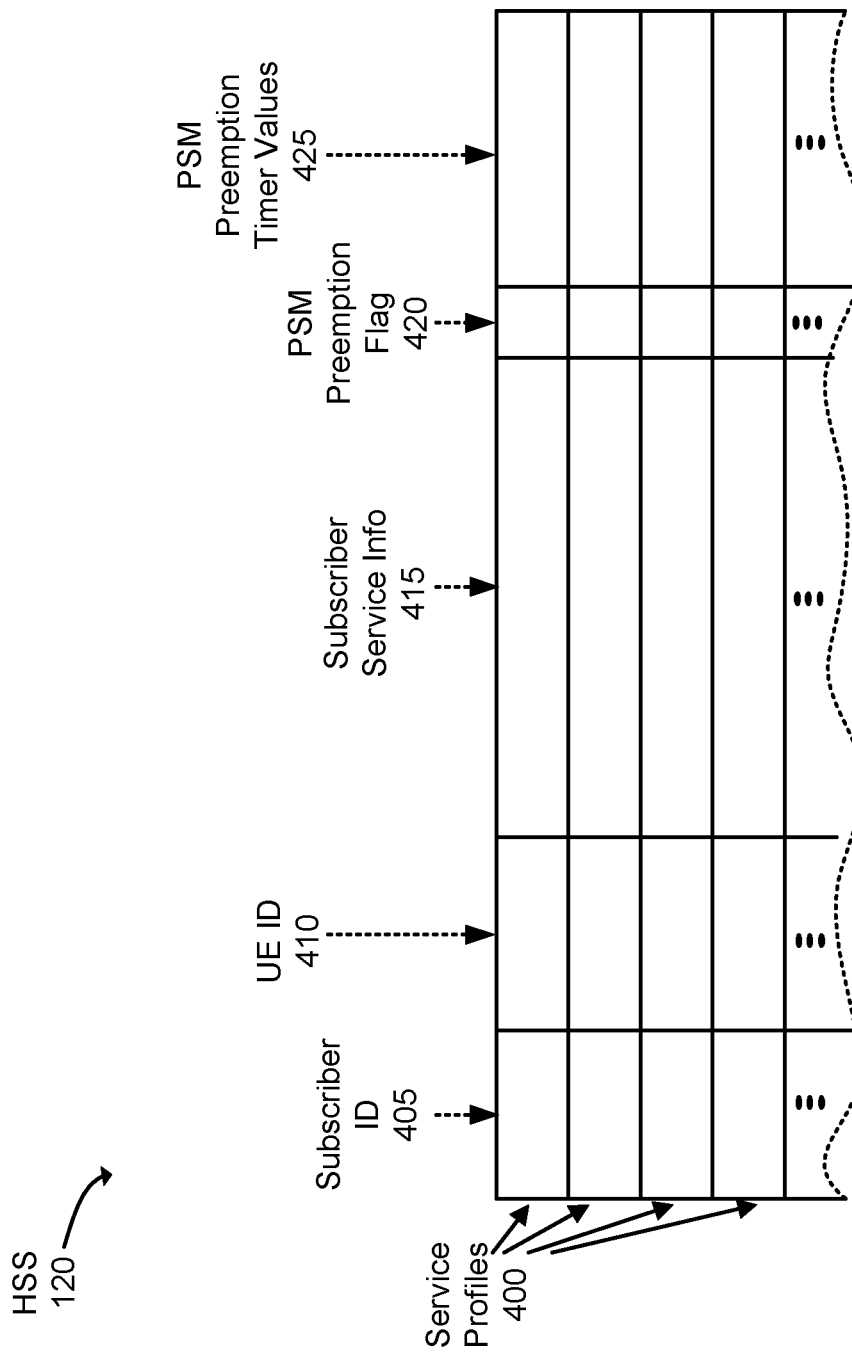
FIG. 4 is a diagram that depicts an exemplary implementation of a data structure stored in the home subscriber server of FIG. 2.

FIG. 4 is a diagram that depicts an exemplary implementation of a data structure stored in HSS 120. As shown, a data structure of HSS 120 may store multiple service profiles 400, with each service profile 400 including a subscriber identifier (ID) field 405, a UE ID field 410, a subscriber service information field 415, a power saving mode (PSM) preemption flag field 420, and a PSM preemption timer values field 425. The data structure of HSS 120 may be stored within a memory of a network device 300. Each service profile 400 shown in FIG. 4 corresponds to a UE service profile 130 depicted in FIG. 1.

Subscriber identifier (ID) field 405 stores a unique ID for a particular subscriber 220 that subscribes to a network service. The unique ID of the subscriber 220 may include any type of alphanumeric ID, or other type of ID, that uniquely identifies the subscriber 220 among multiple other subscribers.

UE ID field 410 stores a unique identifier (e.g., a globally unique ID (GUID)) for a respective UE 100 to which the service profile 400 is directed. Any type of unique identifier may be assigned to a particular UE 100 and used for identification purposes. For example, UE ID field 410 may store an International Mobile Subscriber Identity (IMSI) and/or Mobile Directory Number (MDN) for the UE 100 of the service profile 400. Subscriber service information field 415 stores information related to providing the network service(s) via network(s) 210 to which the subscriber 220 identified in field 405 has subscribed, to the UE identified in field 410.

PSM preemption flag field 420 stores a flag that, when set, indicates that the UE identified in field 410 of the subscriber identified in field 405 has been selected by a centralized entity (e.g., by an AS 110) for preemptive power saving mode, using preemption PSM times supplied by the centralized entity and stored in field 425. As described above, such an indication causes the AS PSM timer values to preempt any PSM timers obtained from any other source (e.g., UE-requested, or network-initiated, timers).

PSM preemption timer values field 425 store power saving mode timer values that, when the flag in field 420 is set, are to be used for controlling a power saving mode of the UE identified in field 410. When the flag in field 420 is set, the PSM preemption timer values stored in field 425 are retrieved and used by MME/AMF 105 for establishing a schedule and duration associated with execution of the power saving mode at the UE 100. The PSM preemption timer values stored in field 425 may include, in one implementation, a T3324 active timer value and a T3412 extended timer value. The T3324 active timer value defines a length of time that the UE 110 stays active after initiation of an idle mode at the UE 100 and during which the UE 100 engages in the monitoring of any paging from the wireless network. The T3412 extended timer value defines a length of time that the UE 110 conserves power by shutting down all non-critical functionality. In other embodiments, other timer values that establish a schedule and duration associated with execution of the power saving mode at the UE 100 may be defined and used based on the application requirements. The other timer values may, for example, include a first timer value defines a length of time that the UE 110 stays active after initiation of an idle mode at the UE 100 and during which the UE 100 engages in the monitoring of any paging from the wireless network. The other timer values may also include, for example, a second timer value that defines a length of time that the UE 110 conserves power by shutting down all non-critical functionality.

To locate a particular service profile 400 within HSS 120, HSS 120 may be queried with, for example, a subscriber ID and a UE ID to locate a service profile 400 having a matching subscriber ID stored in field 405 and a matching UE ID stored in field 410. When such a service profile 400 is located, data may be stored in one or more fields 405, 410, 415, 420, and/or 425, or data may be retrieved from one or more fields 405, 410, 415, 420, and/or 425. Other fields of a service profile 400, instead of subscriber ID field 405 or UE ID field 410, may alternatively be used for querying HSS 120.

HSS 120 is depicted in FIG. 4 as including a tabular data structure with each data structure having a certain number of fields having certain content. The tabular data structure of HSS 120 shown in FIG. 4, however, is for illustrative purposes. Other types of data structures may alternatively be used. The number, types, and content of the entries and/or fields in the data structure of HSS 120 illustrated in FIG. 4 is also for illustrative purposes. Other data structures having different numbers of, types of and/or content of, the entries and/or the fields may be implemented. Therefore, HSS 120 may each include additional, fewer and/or different entries and/or fields than those depicted in FIG. 4.

Figure 5:
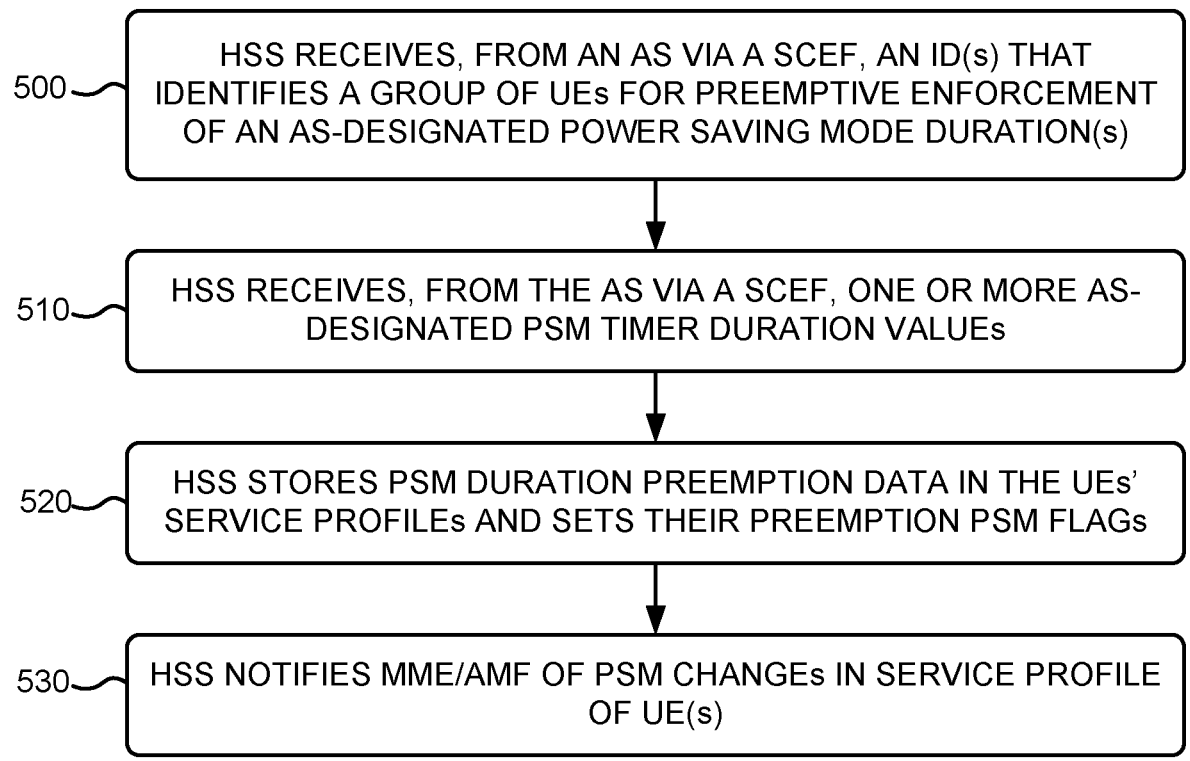
FIG. 5 is a flow diagram that illustrates an exemplary process for receiving preemption power saving mode data from a centralized entity and storing the data in a service profile(s) associated with one or more user equipment devices for use in preemptively controlling the power saving mode duration at those user equipment devices.

FIG. 5 is a flow diagram that illustrates an exemplary process for receiving preemption power saving mode data from a centralized entity (e.g., AS 110) and storing the data in a service profile(s) associated with one or more UEs 100 for use in preemptively controlling the power saving mode duration at those UEs 100. In one implementation, the exemplary process of FIG. 5 may be implemented by HSS 120, in conjunction with an MME/AMF 105. The exemplary process of FIG. 5 is described below with reference to the messaging/operations diagram of FIG. 6.

Figure 6:
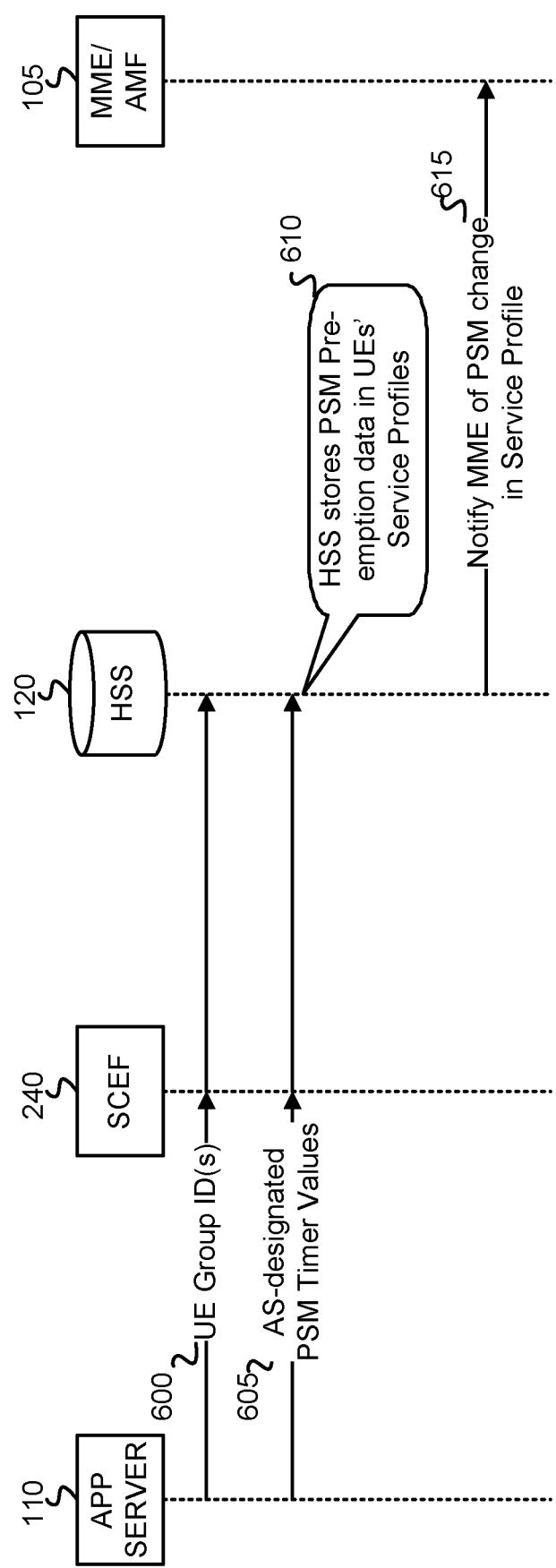
FIG. 6 is an exemplary operations/messaging diagram associated with the exemplary process of FIG. 5.

The exemplary process includes HSS 120 receiving, from an AS 110 via a SCEF 240, an ID(s) that identifies a group of UEs 100 for preemptive enforcement of an AS-designated power saving mode duration(s) (block 500), where the group of UEs 100 may include one or more UEs 100. AS 110 may be responsible for controlling a power saving mode of a particular group of IoT or M2M UEs 100. AS 110 may maintain a group ID that uniquely identifies the entire group of UEs 100, or AS 110 may maintain multiple, individual UE IDs that each uniquely identify a particular one of the group of UEs 100. FIG. 6 depicts an app server 110 sending a message 600, that includes a UE group ID(s), to HSS 120 via a SCEF 240. Upon receipt, HSS 120 may map the UE group ID(s) to individual UE IDs. For example, UE_group_ID_1 may map to UE IDs UE_ID_1, UE_ID_2, and UE_ID_3.

HSS 120 receives, from the AS 110 via the SCEF 240, one or more AS-designated PSM timer duration values (block 510). Based on knowledge of the resource requirements of application(s) being executed at the UEs 100 in the identified group of UEs 100, AS 110 generates one or more PSM timer duration values for controlling the power saving mode at the identified UEs 100. In one example of the implementation of a power saving mode, the one or more PSM timer duration values may include a T3324 active timer value, and a T3412 extended timer value. FIG. 6 depicts AS 110 supplying AS-designated PSM timer values 605 to HSS 120 via the SCEF 240.

HSS 120 stores PSM duration preemption data in the UE 100s' service profiles and sets their preemption PSM flags (block 520). For each UE 100 identified in block 500, HSS 120 locates a service profile 400 having a UE ID in field 410 that matches the identified UE 100, sets the preemption flag in field 420, and stores the received PSM preemption timer values in field 425. With the preemption flag set in field 420, MME 105 may subsequently use the PSM preemption timer values in field 425 for preemptively engaging a power saving mode, having a duration(s) specified by the timer values, at the UEs 100 identified in block 500. FIG. 6 depicts HSS 120 storing 610 PSM preemption data in the UE service profiles of the UEs 100 identified by the received UE group ID(s).

HSS 120 notifies MME/AMF 105 of PSM changes in the service profile of the UE(s) (block 530). For each UE 100 identified in block 500, HSS 120 sends a notification to a corresponding MME/AMF 105 that indicates that preemptive PSM timer values have been provided for use in enforcing a power saving mode at the UE 100 over UE-requested or network-initiated power saving modes. FIG. 6 depicts HSS 120 sending a notification 615 to MME/AMF 105 that identifies a power saving mode change in the service profile of a UE 100. HSS 120 sends a notification 615 to MME/AMF 105 for each UE 100 identified in block 500.

The exemplary process of FIG. 5 may, in one implementation, be repeated at HSS 120 each time a centralized entity, such as, for example, an AS 110 provides preemption PSM duration data for enforcement of a power saving mode at one or more UEs 100 that preempts any UE-requested power saving modes, or network-initiated power saving modes. In some implementations, each update of the PSM duration preemption data in a service profile 400 of HSS 120 may have an associated time-to-live (TTL). After the TTL period has expired, the PSM duration preemption data may be deleted from field 425, and the flag in field 420 may be reset.

Figure 7A:
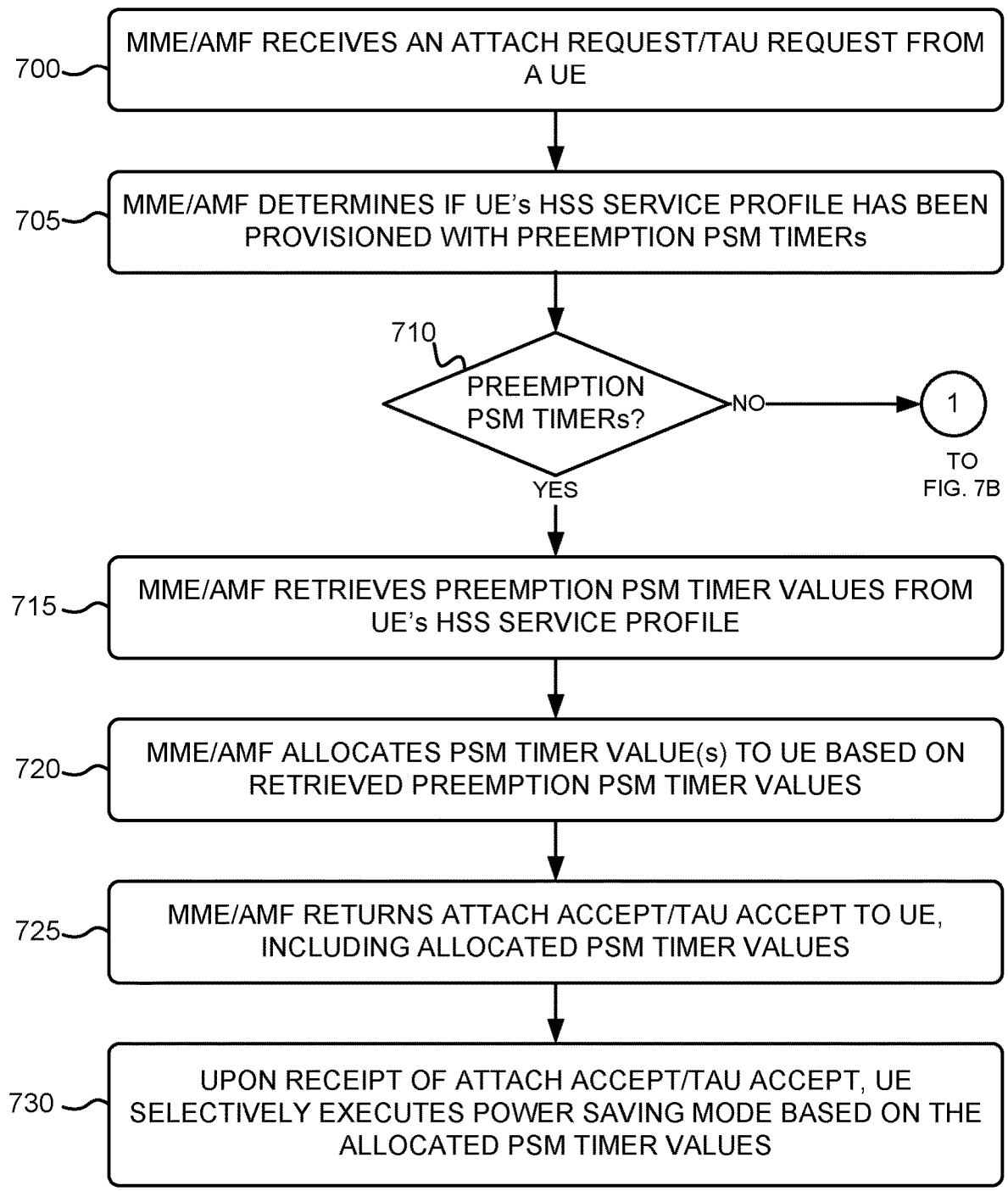
FIGS. 7A and 7B are flow diagrams that illustrate an exemplary process for selective preemptive enforcement of user device power saving mode duration by a centralized entity.
Figure 7B:
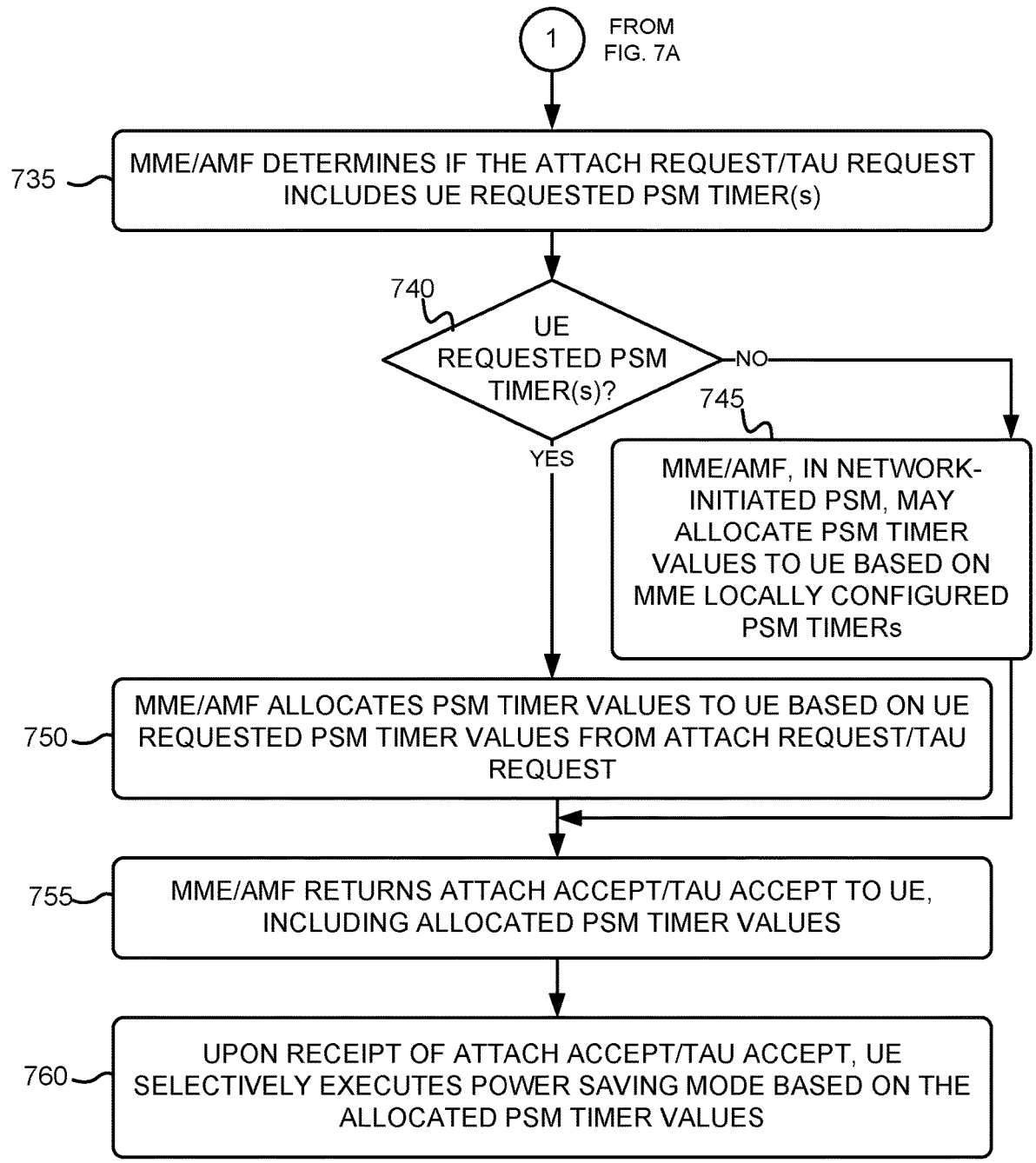

FIGS. 7A and 7B are flow diagrams that illustrate an exemplary process for selective preemptive enforcement of user device power saving mode duration by a centralized entity (e.g., an AS 110) over other sources of power saving mode control. The exemplary process of FIGS. 7A and 7B may be implemented by MME/AMF 105. The exemplary process of FIGS. 7A and 7B is described below with reference to the exemplary messaging/operations diagram of FIG. 8.

Figure 8:
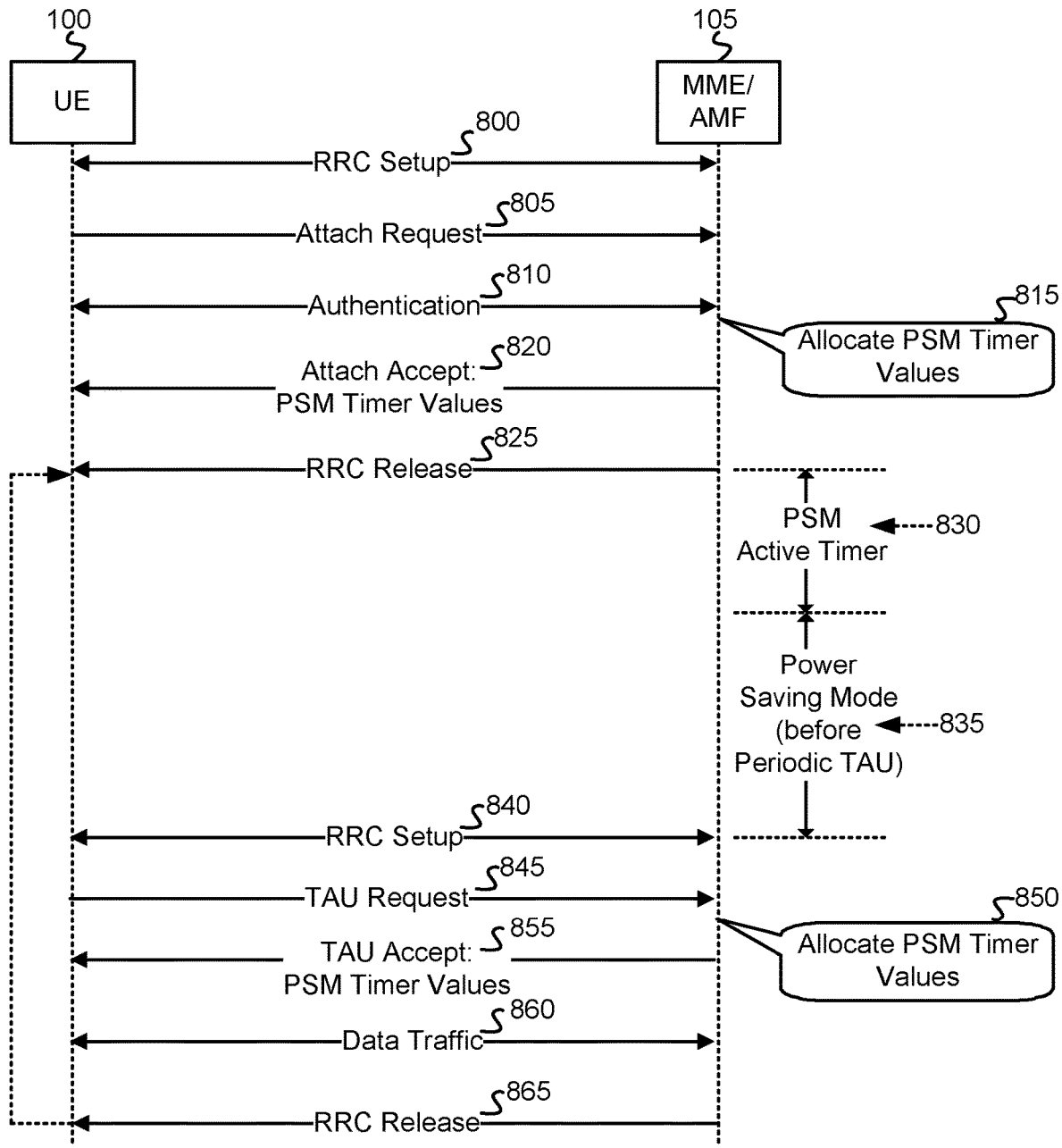
FIG. 8 is an exemplary operations/messaging diagram associated with the exemplary process of FIGS. 7A and 7B.

MME/AMF 105 receives an attach request or a tracking area update (TAU) request from a UE 100 (block 700). The attach request requests that the UE 100 be registered with the network (e.g., with MIME/AMY 105 and HSS 120) so that the UE 100 may receive network services. The attach request may include, for example, a unique identifier that identifies the UE 100. The TAU request announces to the network (e.g., to MME/AMF 105) that a previously registered UE 100 is able to receive data. The TAU request may additionally identify the tracking area (TA) in the network in which the UE 100 is currently located. As shown in FIG. 8, when a UE 100 initially connects to, and registers with, a wireless network (e.g., a PLMN), the UE 100 may first engage in Radio Resource Control (RRC) setup 800 with MME/AMF 105 of the wireless network. RRC setup 800 implements a RRC process that sets up radio resources for use by the UE 100. Subsequent to completion of the RRC setup 800, UE 100 may send an attach request 805 to register with the network. In some implementations, the attach request 805 may include UE-requested PSM timer values, sent by the UE 100 for requesting execution of a power saving mode. Subsequent to the attach request 805, UE 100 and MME/AMF 105 may engage in an authentication process 810 to authenticate the UE 100 for receiving network service.

MME/AMF 105 determines if the UE 100's HSS service profile has been provisioned with preemption PSM timers (block 705). MME/AMF 105, using the UE 100's UE ID, requests the UE's service profile 400 from HSS 120. HSS 120 performs a lookup into the data structure of FIG. 4 to locate a service profile 400 having a UE ID stored in field 410 that matches the UE 100's UE ID. HSS 120 extracts a copy of the located service profile 400, and sends the content of the service profile 400 to MIME/AMY 105. Upon receipt of the service profile, MME/AMF 105 checks whether the PSM preemption flag is set in field 420 of the service profile. If the PSM preemption flag is set, indicating that a centralized entity (e.g., an AS 110) has supplied PSM timer values that are to be used preemptively relative to any other power saving mode timer values requested by the UE 100 itself, or by the wireless network, then field 425 of the service profile 400 should contain the centralized entity-designated PSM preemption timer values.

If the UE 100's HSS service profile has been provisioned with preemption PSM timers (YES—block 710), then MME/AMF 105 retrieves the preemption PSM timer values from the UE 100's HSS service profile (block 715). If the PSM preemption flag in field 420 of the service profile is set, then MME/AMF 105 retrieves the contents of field 425 from the service profile 400, including one or more power saving mode timer values. In one implementation, the contents of field 425 may include an AS-designated value for the T3324 active timer, and an AS-designated value for the T3412 extended timer. In another implementation, the contents of field 425 may include one or more other AS-designated timer values. The other AS-designated timer values may, similar to the T3324 active timer and the T3412 extended timer values, establish a schedule and duration associated with execution of the power saving mode at the UE 100. The other AS-designated timer values may, for example, include a first timer value defines a length of time that the UE 110 stays active after initiation of an idle mode at the UE 100 and during which the UE 100 engages in the monitoring of any paging from the wireless network. The other timer values may also include, for example, a second timer value that defines a length of time that the UE 110 conserves power by shutting down all non-critical functionality.

MME/AMF 105 allocates power saving mode timer value(s) to the UE 100 based on the retrieved preemption PSM timer values (block 720). In one implementation, MME/AMF 105 allocates the exact timer values retrieved from field 425 of the UE 100's service profile 400 as the power saving mode timer values. In another implementation, MME/AMF 105 may adjust the values of the retrieved preemption PSM timer values based on network traffic conditions, or based on other factors, to generate the power saving mode timer values. FIG. 8 depicts MME/AMF 105 allocating 815 PSM timer values to the UE 100 based on the retrieved preemption PSM timer values.

MME/AMF 105 returns an attach accept or TAU accept to the UE 100, including the PSM timer values allocated in block 720 (block 725). FIG. 8 depicts MME/AMF 105 returning an attach accept 820 to the UE 100 that includes the allocated preemption PSM timer values for use by the UE 100 in executing a power saving mode. Upon receipt of the attach accept or TAU accept, the UE 100 selectively executes a power saving mode based on the allocated PSM timer values received in the attach accept or TAU accept (block 730). When the connection between the UE 100 and the wireless network has been inactive for a predetermined period of time, MME/AMF 105, as shown in FIG. 8, sends a RRC connection release 825 to UE 100. Upon receipt of the RRC release 825, UE 100 activates its PSM active timer 830 for a duration of time corresponding to the T3324 active timer value received from MME/AMF 105 in the attach accept 820. The PSM active timer 830 duration defines a length of time that the UE 110 stays active after initiation of an idle mode at the UE 100 and during which the UE 100 engages in the monitoring of any paging from the wireless network.

At expiration of the PSM active timer 830, UE 100 enters power saving mode by turning off all non-critical functionality and ceasing the monitoring of paging from the wireless network. UE 100 activates its power saving mode timer 835 for a duration of time corresponding to the T3412 extended timer value received from MME 105 in the attach accept 820 (or TAU accept). The power saving mode timer 835 defines a length of time that the UE 110 conserves power by shutting down all non-critical functionality. At the expiration of the power saving mode timer 835, UE 100 wakes up previously powered down functionality, and again engages in RRC setup 840 with MME/AMF 105. RRC setup 840 again implements the RRC process for setting up radio resources for use by the awake UE 100. Subsequent to completion of the RRC setup 840, UE 100 may send a TAU request 845 to MME/AMF 105 that notifies the wireless network that UE 100 is awake and ready to send or receive data. In some implementations, the TAU request 845 may include UE-requested PSM timer values, sent by the UE 100 for requesting execution of a power saving mode.

If the UE 100's HSS service profile has not been provisioned with preemption PSM timers (NO—block 710), then MME/AMF 105 determines if the received attach request or TAU request includes UE-requested PSM timers (block 735). If the PSM preemption flag in field 420 of the service profile of the UE 100 is not set, then MME/AMF 105 analyzes the content of the attach request or TAU request to determine if it contains UE-requested PSM timers. The attach request or TAU request may include, for example, a T3324 active timer value, a T3412 extended timer value, and/or another timer value(s), for a power saving mode that the UE 100 itself requests based on the requirements of a particular application(s) being executed at the UE 100.

If the attach request or TAU request does not include a UE requested PSM timer(s) (NO—block 740), then MME 105, in a network-initiated power saving mode, may allocate PSM timer values to the UE 100 based on MME locally configured PSM timers (block 745). Based on network traffic conditions, or other factors, the wireless network itself may desire to initiate a power saving mode at the UE 100. In such a circumstance, MME/AMF 105 generates appropriate locally MME configured timer values for the UE 100's power saving mode and allocates those timer values to the UE 100.

If the attach request or TAU request includes a UE requested PSM timer(s) (YES-block 740), then MME/AMF 105 allocates PSM timer values to the UE 100 based on the UE requested PSM timer values from the attach or TAU request (block 750). In one implementation, MME/AMF 105 allocates the exact timer values retrieved from the attach request or the TAU request as the power saving mode timer values. In another implementation, MME/AMF 105 may adjust the values of the timer values retrieved from the attach request or the TAU request, based on network traffic conditions, or other factors, to generate the power saving mode timer values. FIG. 8 depicts MME/AMF 105 allocating PSM timer values 850 to the UE 100.

MME/AMF 105 returns an attach accept or TAU accept message to the UE 100 that includes the allocated PSM timer values of block 750 (block 755). In response to an attach request, MME/AMF 105 returns an attach accept with the allocated PSM timer values. In response to a TAU request, MME/AMF 105 returns a TAU accept 855 with the allocated PSM timer values. Upon receipt of the attach accept or TAU accept, the UE 100 selectively executes a power saving mode based on the allocated PSM timer values received in the attach accept or the TAU accept message (block 760).

Similar to the power saving mode process described above with respect to FIG. 8, when the connection between the UE 100 and the wireless network has been inactive for a period of time, the UE 100 activates its PSM active timer 830 for a duration of time corresponding to the active timer value (e.g., T3324 active timer) received from MME/AMF 105 in the attach/TAU accept. The PSM active timer 830 duration defines a length of time that the UE 110 stays active after initiation of an idle mode at the UE 100 and during which the UE 100 engages in the monitoring of any paging from the wireless network.

Upon expiration of the PSM active timer 830, UE 100 enters power saving mode by turning off all non-critical functionality, and ceasing the monitoring of paging from the wireless network. UE 100 enters power saving mode by activating its power saving mode timer 835 for a duration of time corresponding to a timer (e.g., T3412 extended timer) received from MME 105 in the attach/TAU accept. The power saving mode timer 835 defines a length of time that the UE 110 conserves power by shutting down all non-critical functionality. Upon expiration of the power saving mode timer 835, UE 100 wakes up previously powered down functionality, and again engages in RRC setup with MME/AMF 105. Subsequent to completion of the RRC setup, UE 100 may send a TAU request that notifies the wireless network that UE 100 is awake and ready to send or receive data traffic 860. FIG. 8 depicts MME/AMF 105 sending an RRC release 865 to the UE 110.

The exemplary process of FIGS. 7A and 7B may, in one implementation, be repeated at MME/AMF 105 each time MME/AMF 105 receives an attach request or TAU request from a UE 100. Therefore, if MME/AMF 105 handles multiple different UEs 100 within the wireless network, then multiple, different, simultaneous instances of the process of FIGS. 7A and 7B may be executed in parallel by MME/AMF 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7A, and 7B, and message/operations flows with respect to FIGS. 6 and 8, the order of the blocks and/or the message/operations flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a first network device associated with a wireless network, a network service-related request from a first user device, wherein the network service-related request includes user device-requested power saving mode (PSM) timers;
   allocating, by the first network device, the user device-requested PSM timers to the first user device for use by the first user device in executing a first PSM;
   accessing, by the first network device, a first service profile associated with the first user device to determine first preemptive PSM data that preempts the use of the user device-requested PSM timers at the first user device;
   allocating, by the first network device, first preemptive PSM timers to the first user device based on the first preemption PSM data for use by the first user device in executing a second PSM instead of the first PSM; and
   sending, by the first network device, a message to the first user device that includes the first preemptive PSM timers that preempt the use by the first user device of the user-device requested PSM timers.

2. The method of claim 1, wherein the network service-related request includes a network attach request or a tracking area update (TAU) request.

3. The method of claim 1, further comprising:
modifying, based on network conditions, the first preemptive PSM data to generate the first preemptive PSM timers.

4. The method of claim 1, wherein the user-device requested PSM timers include multiple timer values for the use in executing the first PSM.

5. The method of claim 4, wherein the multiple timer values include a first timer value that controls a length of an active period of the user device after entering an idle mode before the first user device enters the first PSM, and a second timer value that controls a length of the first PSM after the active period.

6. The method of claim 1, wherein the first user device is one of a group of multiple user devices, and wherein second preemption PSM data that changes the first preemption PSM data preempts a use of the first preemptive PSM timers for the group of multiple user devices, the method further comprising:
allocating second preemptive PSM timers to the first user device based on the changes to the first preemption PSM data; and
sending a message to the first user device that includes the second preemptive PSM timers to preempt the use by the first user device of the first preemptive PSM timers in executing a third PSM instead of the second PSM.

7. The method of claim 6, wherein the multiple user devices each comprises an Internet of Things (IoT) or a Machine-to-Machine (M2M) device.

8. The method of claim 1, wherein the first preemptive PSM data is provisioned in the first service profile by a subscriber at an application server connected to the wireless network.

9. The method of claim 1, wherein the first network device comprises a mobility management entity (MME) or an Access and Mobility Function (AMF) of the wireless network and wherein accessing the first service profile comprises:
accessing the first service profile stored by a Home Subscriber Server (HSS) of the wireless network.

10. The method of claim 1, further comprising:
receiving, by the first network device, a network service-related request from a second user device;
accessing, by the first network device, a second service profile associated with the second user device to determine if the second service profile includes second preemptive power saving mode (PSM) data that is designated for preempting any user device-requested or network-requested power saving modes at the second user device;
allocating, by the first network device if the second service profile includes the second preemptive PSM data, second preemptive PSM timers to the second user device based on the second preemption PSM data; and
sending, by the first network device in response to the network service-related request from the second user device, an acceptance message to the second user device that includes the second preemptive PSM timers for use by the second user device in executing a power saving mode.

11. A network device, comprising:
a communication interface configured to receive a network service-related request from a first user device, wherein the network service-related request is associated with obtaining network service for the first user device in a wireless network, and wherein the network service-related request includes user device-requested power saving mode (PSM) timers;
a processor, or logic, configured to:
allocate the user device-requested PSM timers to the first user device for use by the first user device in executing a first PSM,
access a first service profile associated with the first user device to determine first preemptive PSM data that preempts the use of the user device-requested PSM timers at the first user device,
allocate first preemptive PSM timers to the first user device based on the first preemption PSM data for use by the first user device in executing a second PSM instead of the first PSM, and
send a message to the first user device that includes the first preemptive PSM timers that preempt the use by the first user device of the user-device requested PSM timers.

12. The network device of claim 11, wherein the network service-related request includes a network attach request or a tracking area update (TAU) request.

13. The network device of claim 11, wherein the processor, or logic, is further configured to:
modify, based on network conditions, the first preemptive PSM data to generate the first preemptive PSM timers.

14. The network device of claim 11, wherein the first preemptive PSM timers include a first timer that controls a length of an active period of the first user device after entering an idle mode before the first user device enters the second PSM, and a second timer that controls a length of the second PSM after the active period.

15. The network device of claim 11, wherein the first user device is one of a group of multiple user devices, and wherein second preemption PSM data that changes the first preemption PSM data and preempts the use of the first preemptive PSM timers for the group of multiple user devices, wherein the processor, or logic, is further configured to:
allocate second preemptive PSM timers to the first user device based on the changes to the first preemption PSM data; and
send a message to the first user device that includes the second preemptive PSM timers to preempt the use by the first user device of the first preemptive PSM timers in executing a third PSM instead of the second PSM.

16. The network device of claim 15, wherein the multiple user devices each comprises an Internet of Things (IoT) or a Machine-to-Machine (M2M) device.

17. The network device of claim 11, wherein the first preemptive PSM data is provisioned in the service profile by an administrator at an application server connected to the wireless network.

18. The network device of claim 11, wherein the network device comprises a mobility management entity (MME) or an Access and Mobility Function (AMF) associated with a wireless network and wherein, when accessing the first service profile associated with the first user device, the processor, or logic, is further configured to:
access the first service profile stored by a Home Subscriber Server (HSS) of the wireless network.

19. The network device of claim 11, wherein the communication interface is further configured to receive a network service-related request from a second user device, and wherein the processor, or logic, is further configured to:

access a second service profile associated with the second user device to determine if the second service profile includes second preemptive power saving mode (PSM) data that is designated for preempting any user device-requested or network-requested power saving modes at the second user device;

allocate, if the second service profile includes the second preemptive PSM data, second preemptive PSM timers to the second user device based on the second preemption PSM data; and send, in response to the network service-related request from the second user device, an acceptance message to the second user device that includes the second preemptive PSM timers for use by the second user device in executing a power saving mode.

20. A non-transitory storage medium storing instructions executable by a network device, wherein the instructions comprise instructions to cause the network device to:

receive a network service-related request from a first user device, wherein the network service-related request is associated with obtaining network service for the first user device in a wireless network, and wherein the network service-related request includes user device-requested power saving mode (PSM) timers;

allocate the user device-requested PSM timers to the first user device for use by the first user device in executing a first PSM;

access a first service profile associated with the first user device to determine if the first first preemptive PSM data that preempts that the use of the user device-requested PSM timers at the first user device;

allocate first preemptive PSM timers to the first user device based on the first preemption PSM data for use by the first user device in executing a second PSM instead of the first PSM; and send a message to the first user device that includes the first preemptive PSM timers that preempt the use by the first user device of the user-device requested PSM timers.

* * * * *